Aug. 2, 1966     I. SCHMIDT ETAL     3,263,819
FILTER LEAF STRUCTURE
Filed June 19, 1963
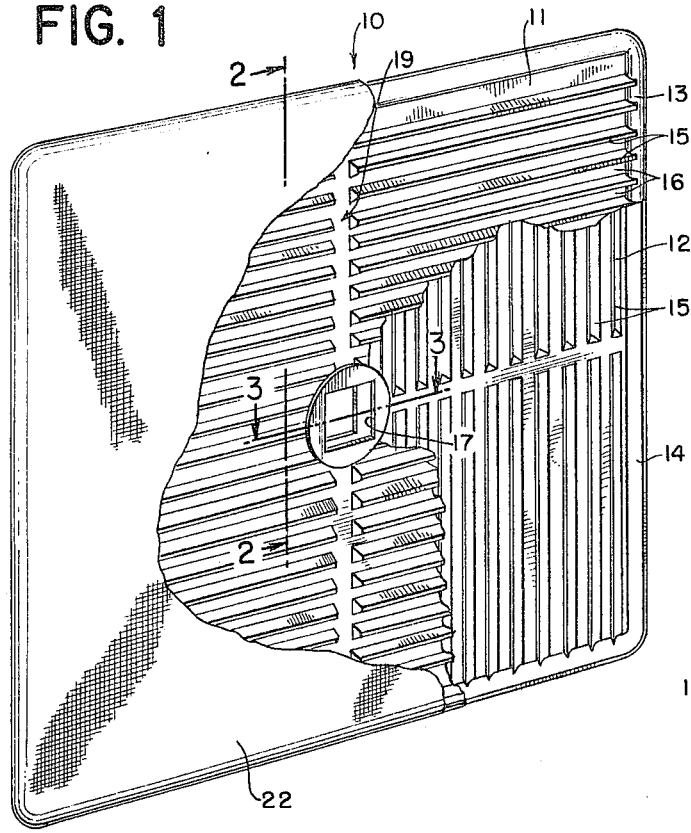
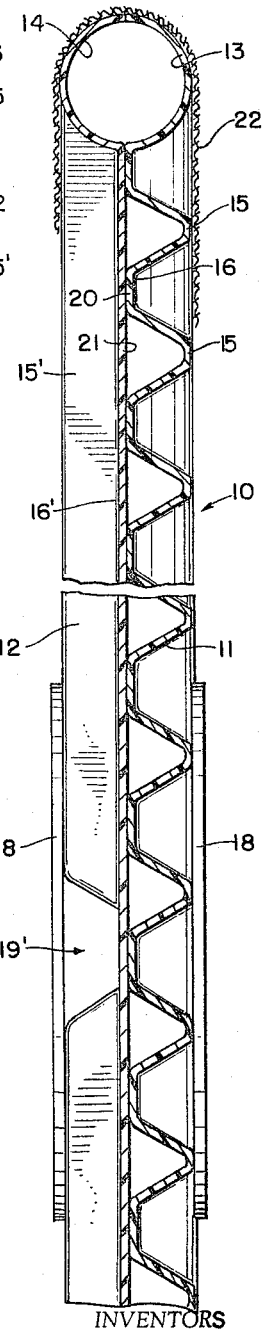
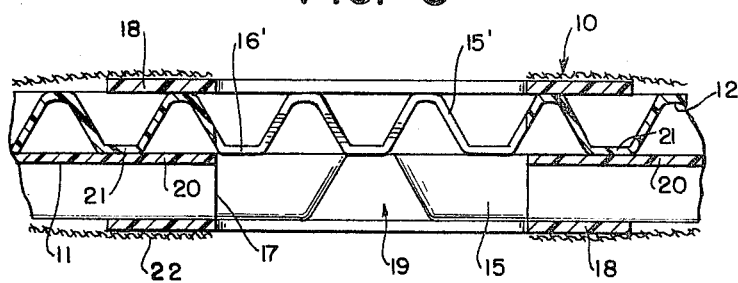
INVENTORS
IRVING SCHMIDT
JAY FREDERICK TAYLOR
BY
ATTORNEYS

United States Patent Office 3,263,819
Patented August 2, 1966

3,263,819
FILTER LEAF STRUCTURE
Irving Schmidt, New City, and Jay Frederick Taylor, Jackson Heights, N.Y., assignors to Multi-Metal Wire Cloth Company, Inc., a corporation of New York
Filed June 19, 1963, Ser. No. 288,988
3 Claims. (Cl. 210—486)

This invention relates to filter leafs used in filtration. The invention particularly provides a new filter leaf structure of the type having a rigid support sandwiched between filtering septa and a rigid support which consists of a pair of sheets, each formed with ribs and channels and united in face-to-face relationship with their respective arrays of ribs and channels extending in different directions.

The function of a filter leaf in filtration is to support septa in such a manner that the largest possible area of each septum can be presented in communication with the slurry so that the slurry can pass through the septa and the filtrate can be collected in channels in the filter leaf support and can flow from the channels to an outlet connected to the support. These filter leafs are used alone or in a battery with similar filter leafs and are incorporated into all types of filters. The septa are generally precoated with a filter-aid such as diatomaceous earth or the like and then the slurry is introduced and it passes through the filter-aid and the septum by pressure, vacuum, gravity or a combination of these forces depending upon the type filter being used. After extended operation of the filter, a filter cake steadily builds up on the filter leaf and the operation continues until the volume of filtrate passing through the filter leaf sharply decreases, at which time the filter cake is removed, usually by a back flushing operation.

As is evident, during the filtration operation the filter leaf is subjected to various forces including the pressure of the slurry arising from the system itself, the weight of the filter-aid and resulting filter cake, and the like. Hence it is essential that the filter leaf not only provide a maximum septum surface area for filtration, but that the filter leaf structure accomplish this with a structure which is mechanically sound and can withstand the forces to which it will be subjected without bending or splitting during filtration.

It is an object of this invention to provide a filter leaf structure which is designed with greater structural strength than comparable filter leafs presently in use, and is nevertheless economical to manufacture since the basic supporting member can be formed by simply bonding two identical sheets together in the manner of the invention. Broadly stated the invention comprises a support structure in a filter leaf of the type in which a rigid support is sandwiched between filtering septa. The support structure consists of a pair of sheets aligned in face-to-face relationship and bonded together to form an integral unit. An array of parallel ribs and channels are formed along a major portion of each of said sheets to define a corrugated filter leaf wall. The sheets are so aligned that the respective arrays of ribs and channels in the sheets extend in different directions. Outlet means are cut into the walls of the support and a collecting duct intersects the ribs and channels of each sheet and leads to the outlet means.

The invention particularly provides a filter leaf support of the type described which is formed from a pair of sheets of plastic material. When a plastic material is used for the support it is imperative that precautions be taken to provide added rigidity thereto. It is applicants' specific finding that by arranging the ribs and channels so that they extend at right angles to each other, the support formed by the united sheets obtains maximum rigidity against bending stress because there are no dominate lines of bending weakness as there would be if the ribs and channels were in parallel co-alignment with each other.

The filter leaf support can be further strengthened by providing a U-shaped marginal portion peripherally surrounding each of the sheets so that the edges of the marginal portion of one sheet can be secured to the marginal portions of the other sheet to form a strengthening and rigidifying tubular border. The cost of manufacturing these sheets is lowest when the sheets are square shaped with the outlet centrally located in the sheets whereby indentical sheets are rotated 90° out of matching alignment with each other and then united so that the ribs and channels extend at right angles to each other. This new assembly has been found to achieve much greater resistance to bending than the conventional filter leafs commonly employed, without any increase in cost and in many instances an appreciable saving for such a structurally sound unit.

A preferred embodiment of the invention is described hereinbelow wherein:

FIG. 1 is a perspective of a filter leaf structure partly broken away to show the support construction;

FIG. 2 is an enlarged fragmentary cross-sectional view taken substantially along lines 2—2 of FIG. 1; and FIG. 3 is an enlarged fragmentary cross-sectional view taken substantially along lines 3—3 of FIG. 1.

The filter leaf structure 10 shown in the drawings consists essentially of a first sheet 11 and a second matching sheet 12 which preferably have been vacuum formed from plastic materials such as a thermoplastic polystyrene resin. The sheets in this embodiment have a substantially square contour and both the first and second sheets have U-shaped peripheral marginal portions 13 and 14 respectively. An array of parallel raised rib portions 15 and 15' and channels 16 and 16' defined by the spaces between the rib portions are formed along a major portion of each of the respective sheets 11 and 12. A square-shaped outlet 17 is cut through each sheet at substantially the mid-point thereof and each outlet has a reinforcing circular disc 18 surrounding the outlet and securely attached to the adjacent rib portions of the sheet. Other than this outlet the sheets are imperforate throughout. Intersecting the array of ribs 15 and channels 16 and leading to the outlet from opposite sides thereof are a pair of collecting ducts 19 and 19'. The collecting ducts 19 and 19' extend at right angles to the extension of the ribs 15 and channels 16 at substantially the mid-line of the respective sheet and the ducts are essentially defined by an absence of formed raised portions along that midline portion of the sheet.

The second sheet 12 has a construction identical to the construction of the first sheet 11. In assembling the filter leaf 10, the first sheet 11 and the second sheet 12 are united by aligning them in face-to-face relationship and bonding them together at the respective U-shaped marginal portions 13 and 14. It is to be noted that the united sheets 11 and 12 are aligned with one of the sheets rotated such that the longitudinal extension of the ribs 15 and channels 16 are 90° out of alignment with the ribs and channels of the other attached sheet. Thus recessed portions 20 defining the base of the channels 16 come in flush contact with recessed portions 21 of the opposite sheet as shown in FIG. 2 and FIG. 3. It is also advantageous to bond the sheets together along these contact points to insure the maximum sealing of the united sheets. When the sheets are united in the manner described, the resulting structure 10 has no predominate line of bending weakness since the embossed array of ribs and channels on one sheet are extended at right angles to the ribs and channels on the other sheet.

After the sheets have been united in the manner described, a fabric of nylon or other cloth material is stretched over the filter leaf structure and comprises the filtering septum 22. As shown in FIG. 2, when the septum is stretched over the filter leaf structure it bridges the rib portions 15 and covers the channels 16 formed in the respective sheets. Since the ribs are designed to converge toward their apex, only a small area of rib portion contacts the septum and thus the maximum area of the septum is presented as the filtering media.

In operation, the filter assembly is positioned within a filtering device and an outlet pipe extends in communication with the outlet 17 and is generally connected to a vacuum pump which assists in drawing the filtrate through the outlet and from the filter leaf. Thereby, as the slurry passes through septum it collects in the channels 16 and passes to the collecting ducts 19 and 19′ where it flows to the outlet 17 and ultimately to the outlet pipe.

We claim:
1. In a filter leaf of the type in which a rigid support is sandwiched between filtering septa, a support structure comprising:
   (a) a pair of sheets of plastic material aligned in face-to-face relationship and bonded together to form an integral support,
   (b) a U-shaped marginal portion peripherally surrounding each of said sheets such that the edges of the marginal portions of one sheet are secured to the marginal portions of the other sheet,
   (c) an array of parallel ribs and channels formed along a major portion of each of said sheets to define a corrugated filter leaf wall, said sheets being so aligned that the respective array of ribs and channels formed in one sheet extends in a different direction than the array of ribs and channels formed in the other sheet,
   (d) outlet means cut through the walls of the support at substantially the center portion thereof, and
   (e) a collecting duct intersecting the ribs and channels of each sheet and leading to the outlet means.

2. In a filter leaf of the type in which a rigid support is sandwiched between filtering septa, a support structure comprising:
   (a) a pair of sheets of plastic material aligned in face-to-face relationship and bonded together to form an integral support,
   (b) a U-shaped marginal portion peripherally surrounding each of said sheets such that the edges of the marginal portions of one sheet are secured to the marginal portions of the other sheet,
   (c) an array of parallel ribs and channels formed along a major portion of each of said sheets to define a corrugated filter leaf wall, said sheets being so aligned that the respective array of ribs and channels formed in one sheet extends at right angles to the direction of extension of the array of ribs and channels formed in the other sheet,
   (d) outlet means cut through the walls of the support substantially at the center portion thereof, and
   (e) a pair of collecting ducts in each sheet intersecting the ribs and channels of the sheet and leading to the outlet means.

3. In a filter leaf of the type in which a rigid support is sandwiched between filtering septa, a support structure comprising:
   (a) a pair of square sheets of plastic material aligned in face-to-face relationship and bonded together to form an integral square support,
   (b) a U-shaped marginal portion peripherally surrounding each of said sheets such that the edges of the marginal portions of one sheet are secured to the marginal portions of the other sheet to form a strengthening and rigidifying tubular border,
   (c) an array of parallel ribs and channels formed along a major portion of each of said sheets to define a corrugated filter leaf wall, said sheets being so aligned that the respective array of ribs and channels formed in one sheet extends at right angles to the extensions of the channels formed in the other sheet, and the sheets are united to each other along the points of contact between the respective ridges and grooves of the united sheets, said filter leaf wall being substantially imperforate,
   (d) outlet means cut through the support at substantially the center portion thereof and free from said septa,
   (e) a flange member mounted on each of said sheets surrounding said outlet, and
   (f) a pair of collecting ducts in each sheet intersecting the ribs and channels of the sheet and leading to the outlet means.

References Cited by the Examiner

FOREIGN PATENTS

| | | |
|---|---|---|
| 580,230 | 8/1924 | France. |
| 645,586 | 11/1950 | Great Britain. |
| 55,888 | 12/1936 | Norway. |

REUBEN FRIEDMAN, *Primary Examiner.*

D. M. RIESS, *Assistant Examiner.*